May 15, 1951 J. J. REEVES 2,552,588

GAMMA CONTROL CIRCUIT

Filed April 26, 1947 2 Sheets-Sheet 1

INVENTOR
JAMES J. REEVES
BY
Pennie, Edmonds, Morton & Barrows
ATTORNEYS

INVENTOR
JAMES J. REEVES
BY
Pennie, Edmonds, Morton & Barrows
ATTORNEYS

Patented May 15, 1951 2,552,588

UNITED STATES PATENT OFFICE 2,552,588

GAMMA CONTROL CIRCUIT

James J. Reeves, Parkchester, N. Y., assignor to Columbia Broadcasting System, Inc., New York, N. Y., a corporation of New York Application April 26, 1947, Serial No. 744,256

14 Claims. (Cl. 178—7.1)

This invention relates to television and like apparatus wherein picture signals are transmitted and reproduced, and provides a method and apparatus for altering the contrast or "gamma" of such picture signals.

Two primary attributes of reproduced pictures, in general, are brightness and contrast. The contrast range of a reproduced picture is the range of brightness between the darkest portion of the picture and the brightest portion. Since the eye has a logarithmic response, contrast range is commonly expressed in terms of the ratio between the brightest portion and the darkest portion. The term "contrast" is also applied to the degree of differentiation between different tones in a picture.

In television and similar apparatus, if the brightnesses of all parts of the reproduced picture were exactly the same as the brightnesses of the corresponding parts of the original scene, correct contrast would be obtained. However, this is not possible in television, nor indeed in any other reproduction system. Furthermore, it is not necessary, as is apparent from the art of photography. Commonly the average brightness of a reproduced picture is far different from that of the original scene. Also the contrast range of the reproduction is usually more limited than that of the original scene. Nevertheless, excellent pictures may still be obtained. Generally speaking, a contrast range of 30 or 50 to 1 is adequate, and within this range the brightnesses of various parts of the reproduced picture should be approximately proportional to the brightnesses of corresponding parts of the original scene.

The term "gamma" is used in photography to define the slope of the characteristic curve of density against the logarithm of the exposure. The over-all gamma of a reproducing system may also be defined as the slope of a straight line portion of the characteristic curve of the logarithm of image brightness versus the logarithm of object brightness. This conception is useful in television in relating the brightness variation of the reproduced picture to that of the original scene. Actually, the characteristic curves in various portions of a television system often display curvature, and do not have a truly straight line portion to which the term gamma may be strictly applied. For this reason, the term "contrast gradient" is sometimes employed. However, the term "gamma" is commonly used in the television art in this broader sense.

There is often need in television and like systems to control the contrast gradient or gamma represented by the picture signal. While many components in a television system are linear, or nearly linear, certain components are often not linear, particularly the pickup tube and the reproducing cathode-ray tube. For example, the gamma of a reproducing cathode-ray tube is usually considerably greater than unity. Values from 1.5 to 3 have been obtained. Transmitting pickup tubes such as the Iconoscope commonly have a gamma somewhat less than unit. Furthermore, motion picture film is often used as the source of program material, and such film is commonly developed to give a gamma greater than unity, of the order of 1.4.

Due to the fact that in a complete television system different types of pickup tubes may be employed, and both direct pickup and motion picture film are customarily used, it is highly desirable to be able to adjust the over-all gamma of the system so that the reproductions at the receiver will be as realistic as possible. Also, different types of subject matter being transmitted may require a change of gamma in order to produce the best effect.

The present invention provides a method and apparatus for changing the contrast gradient or gamma of picture signals quickly and simply, under the control of the operator. In the specific embodiment to be described, the gamma may be either increased or decreased at will, and this may be accomplished without changing the over-all amplitude of the picture signal. The latter is an important advantage since the gamma may be changed without disturbing other adjustments which must be made in the system. It is particularly contemplated that the gamma control apparatus will be employed at the transmitter, where skilled operators are available. However, it is possible to utilize it at a receiver also if desired.

In accordance with the invention the picture signal is simultaneously applied to a plurality of non-linear amplifying channels. The non-linear characteristics of the channels are selected with respect to the polarities of the picture signal applied thereto to amplify signal portions representing different light intensities by different amounts in different channels. The outputs of the channels are then combined in desired proportion. It is particularly contemplated to employ two channels and amplify the highlights to a greater extent than shadows in one channel, and to a lesser extent than shadows in the other channel. By combining the outputs of the two channels in desired portions, the gamma of the combined signal may be readily altered.

Advantageously, two channels are employed having similar non-linear amplitude characteristics and the picture signal is applied in opposite polarity to the two channels. This results in expanding the highlights with respect to the shadows in one channel and expanding the shadows with respect to the highlights in the other channel. The two outputs are then applied in like polarity to a mixer circuit which combines the two outputs into a single composite signal. Signal amplitude controls are inserted between the outputs of the non-linear channels and the mixer circuit and correlated so that as the output signal from one channel is increased, that of the other channel is decreased in like amount so as to maintain the amplitude of the combined signals substantially constant. This permits changing the gamma of the original picture signal in either a positive or negative direction, that is either increasing or decreasing the gamma, without changing the magnitude of the resultant signal.

The invention will be more fully understood from the following description of specific embodiments thereof, taken in conjunction with the drawings, in which.

Figures 1, 2, 3:
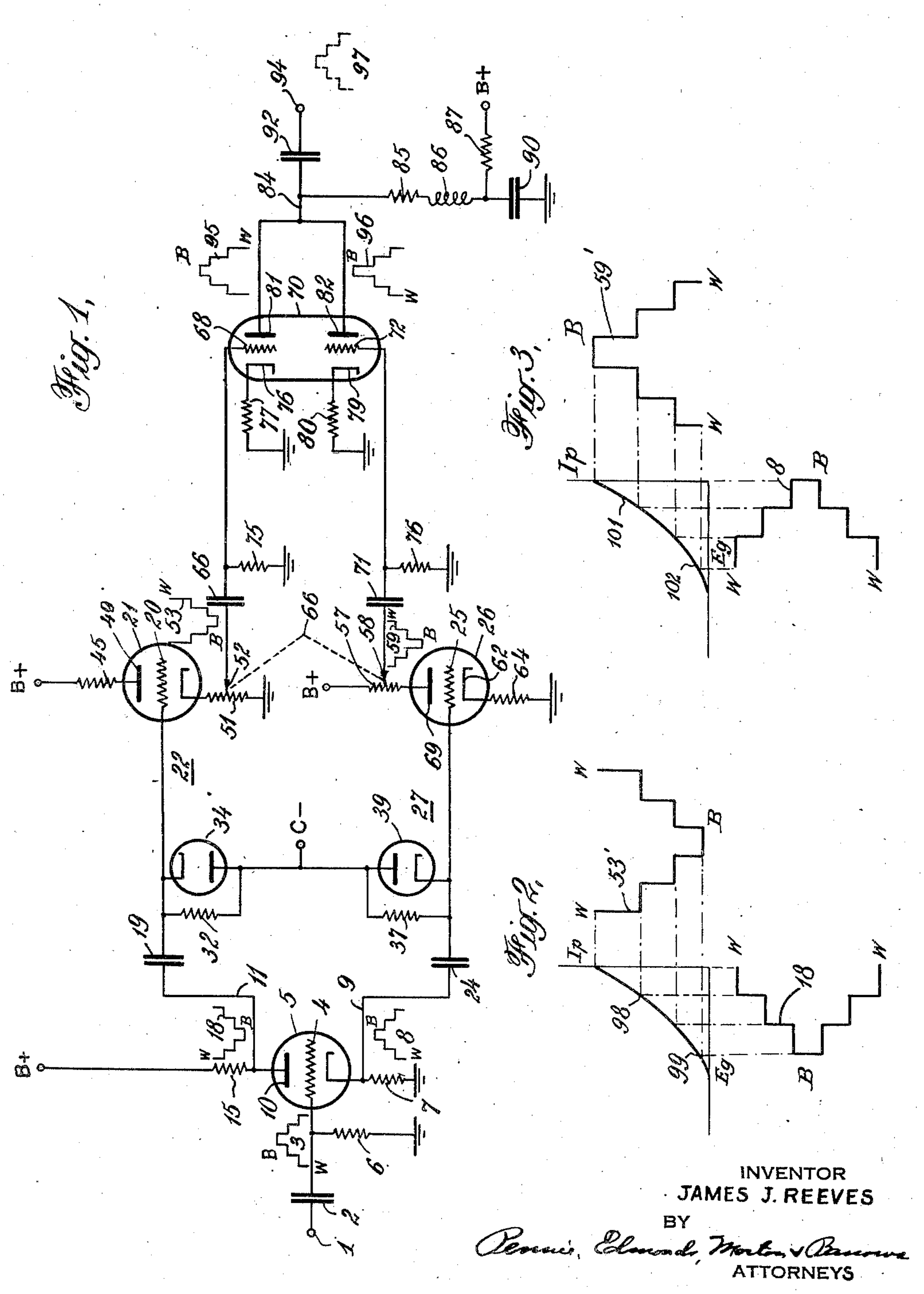
Fig. 1 is a circuit diagram of one embodiment of the invention.
Fig. 2 is a graphic representation showing the effect of one channel of the circuit of Fig. 1.
Fig. 3 is a graphic representation showing the effect of the other channel of Fig. 1.
Figures 4, 5:
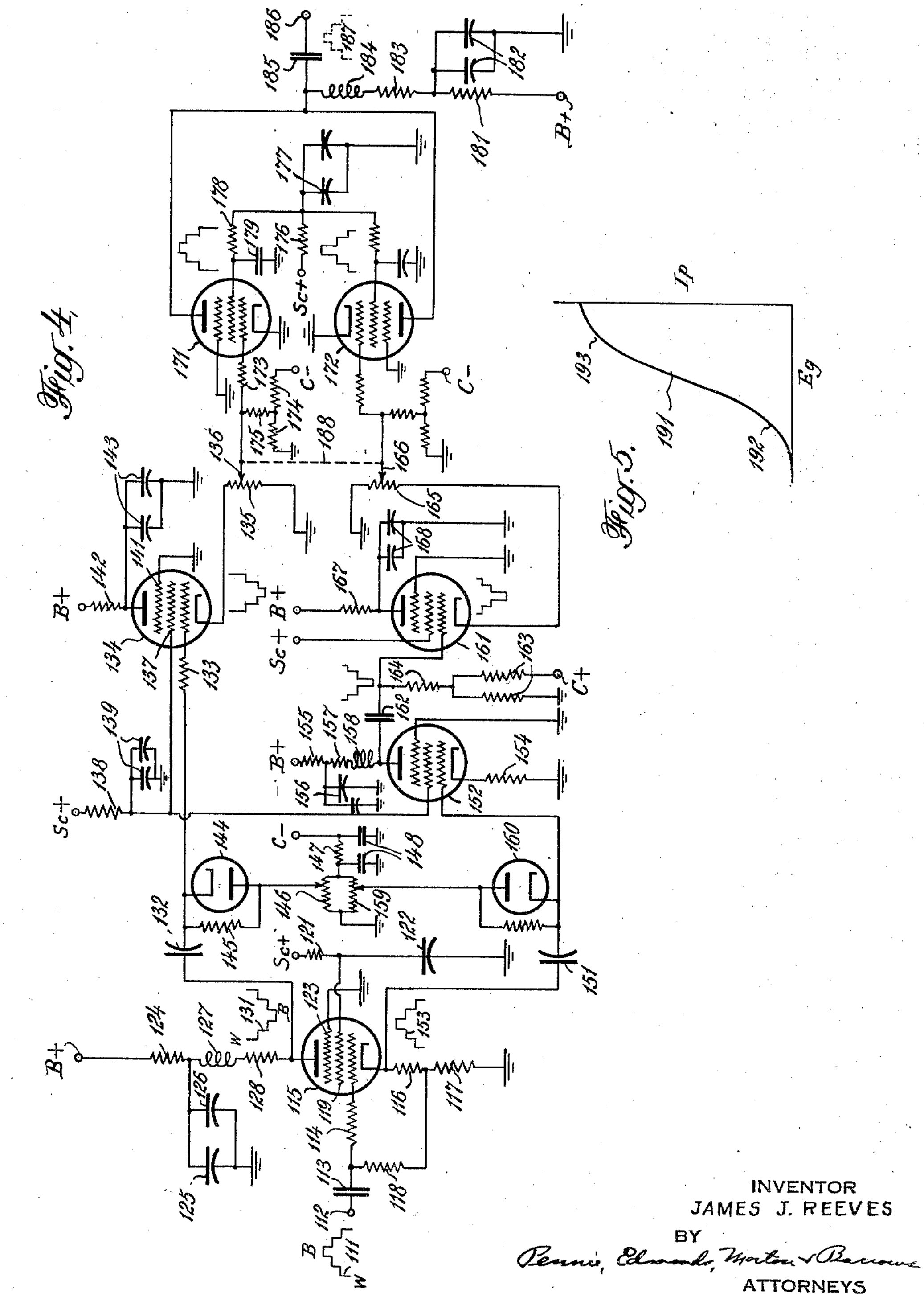
Fig. 4 is a circuit diagram illustrating another preferred embodiment of the invention.
Fig. 5 is a characteristic curve illustrating a modified manner of operation.

In Figs. 1 and 4, the waveform is illustrated schematically at several points to facilitate understanding the operation of the circuits.

Referring now to Fig. 1, an input circuit is shown comprising tube 5 connected as a phase-splitting circuit. An input picture signal, here assumed to be a television video signal, is applied at input terminal 1 and is fed to the grid 4 of tube 5 through coupling capacitor 2 and shunting resistor 6. Tube 5 is here shown as a conventional triode, but other types of tubes may be employed if desired.

The input video signal is here shown with the whites or highlights at low amplitude and the blacks or shadows at high amplitude, as shown by the waveform 3. Although the actual video signal is of the normal type, waveform 3 is shown as a stepped curve with equal vertical increments in order that subsequent changes therein may be conveniently represented. The letters "W" and "B" are used to indicate the directions of the white and black portions of the signal wave. A cathode resistor 7 is provided for tube 5 and the video signal appears thereacross with the same polarity as the input signal, as shown by waveform 8. This signal is applied to one non-linear amplifying channel through lead 9. The signal for the other non-linear amplifying channel is obtained from the anode circuit through lead 11.

Anode 10 receives its B+ power supply, preferably regulated, through the load resistance 15. The anode circuit is advantageously designed so that the phase differences between like frequency components through the two non-linear channels are minimized or cancelled.

The video signal in output lead 11 is 180 degrees out of phase with that in lead 9, and therefore the polarity is inverted as shown by waveform 18.

The video signal in lead 11 is applied to the upper non-linear amplifying channel generally designated as 22, comprising tube 21 connected as a non-linear amplifier whose characteristic curve is shown in Fig. 2. The video signal is applied through coupling capacitor 19 to grid 20 of tube 21. Tube 21 is shown as a triode but of course may be any other suitable tube if desired. The video signal in lead 9 is supplied to the lower non-linear amplifying channel generally designated as 27, and is connected through coupling capacitor 24 to the grid 25 of tube 26.

D.-C. reinjection or clamping circuits are supplied for both channels so as to apply the signals to respective grids at substantially constant reference bias potentials. Simple diode D.-C. restorers are here shown, but pulsed type clampers or other suitable types may be used if desired.

In the upper channel the clamper circuit is shown as comprising diode 34 shunted by resistor 32 and connected between grid 20 and a C— voltage source of suitable value. The clamper circuit functions to maintain the negative portion of the video signal at a constant negative bias regardless of signal amplitude. In the lower channel a similar diode 39 shunted by resistor 37 is provided between grid 25 and the C— source. The bias values are advantageously selected so that the tubes 21 and 26 will operate on similar non-linear characteristics. The clamping circuits insure that the signal will operate over the same portions of the non-linear characteristics of the two tubes.

Tube 21 in the upper channel is supplied with B+ voltage, preferably regulated, through the load resistor 45 connected to the anode 49. Potentiometer 51 is provided as cathode resistor and an output signal of any desired magnitude is obtained by varying the movable contact 52 of the potentiometer. The output signal will have the same polarity as that applied to the grid, as shown by waveform 53, but the highlights will be expanded with respect to the shadows due to the non-linear amplification, as indicated by greater vertical increments in the highlight portion of the stepped waveform.

The non-linear amplifying tube 26 in the lower channel is also provided with a cathode resistor 64. The anode 69 receives its B+ voltage, preferably regulated, through the potentiometer 57 serving as load resistance. An output signal of any desired magnitude may be obtained at the movable contact 58 of the potentiometer. This output signal will have a polarity inverted from that applied to the grid, as will be evident by comparing waveforms 59 and 8.

It should be noted that the outputs of two non-linear amplifying stages have the same polarity as shown by waveforms 53 and 59. However, whereas in the upper channel the portions of the signal representing the highlights have been expanded with respect to the shadows, in the lower channel the shadows have been expanded with respect to the highlights.

The outputs of the non-linear amplifiers are supplied to a mixing circuit comprising tube 70 and associated circuit elements. Tube 70 is here shown as a double triode having similar cathode resistors 77 and 80, and a single output circuit. The two sections are therefore similar, and advantageously operate over linear portions of their characteristics.

The output signal of tube 21 is supplied through coupling capacitor 66 and shunting resistor 75 to grid 68 of one section of tube 70. The output of tube 26 in the lower channel is supplied through coupling capacitor 71 and shunting resistor 76 to grid 72 of the other section of tube 70. The anodes 81 and 82 are connected together and are provided with B+ voltage through resistor 87, shunted by low frequency compensating capacitor 90, peaking coil 86 and load resistor 85. The outputs of two non-linear amplifying channels are hence combined in the mixer stage to form a single composite output video signal which is supplied through coupling capacitor 92 to the output terminal 94.

The outputs at anodes 81 and 82 will have the same polarity, as shown by waveforms 95 and 96, but the highlights will be expanded in the output of the upper section and the blacks will be expanded in the output of the lower section. The two outputs will be combined to form the composite signal shown by waveform 97, and the magnitudes of the two components will be determined by the settings of potentiometers 52 and 58. The two potentiometers are conveniently ganged together to a common control 66 in such a manner that as the output signal is increased in the upper channel it is decreased in the lower channel in like amount, and vice versa. This results in varying the two output signals inversely in complementary relationship. Thus at the mixer stage the two signals are combined in any desired proportion but the over-all amplitude of the composite signal remains substantially fixed.

If control 66 is adjusted so that contacts 52 and 58 are at their mid-points, the outputs will be combined in the mixer in equal portions and hence the composite signal will have the same gamma as the input signal at terminal 1. The dotted composite signal waveform 97 represents this condition. However, if the output of the upper channel is increased and the lower channel decreased by moving both potentiometer contacts upward, the composite signal will have the highlights expanded with respect to the shadows, thus changing the gamma in one direction. If the output of the lower channel is increased and the upper decreased, the shadows will be expanded more than the whites and the gamma of the composite signal changed in the opposite direction. Hence any desired gamma may be obtained in the output composite signal without changing the magnitude thereof.

Fig. 2 shows a representative non-linear characteristic 98 of tube 21 in the upper channel. The clamping action of diode 34 serves to maintain the black level of the input wave 18 at a constant negative bias potential indicated at point 99. The highlights extend up the steeper portion of characteristic 98 a distance depending upon the amplitude range of the input signal. Due to the fact that the highlights lay on a steeper portion of the characteristic, they are amplified to a greater extent than the shadows, as indicated by waveform 53'.

Fig. 3 shows a representative non-linear characteristic 101 of tube 26 in the lower channel. In this case diode 39 serves to maintain the white level of the input wave 8 at a constant negative bias represented by point 102. The shadows extend up the steeper portion of the characteristic 101, in this case, so the shadows are amplified to a greater extent than the highlights as indicated by waveform 59'. Thus the signal amplitude range is substantially the same in each channel but different portions of the amplitude range are expanded in respective channels.

Waveform 53' of Fig. 2 is a current waveform whereas waveform 53 in Fig. 1 is a voltage waveform. Since the voltage is derived from the cathode circuit of tube 21 the two waveforms have the same polarity. Current waveform 59' of Fig. 3 is inverted with respect to voltage waveform 59 in Fig. 1, since the voltage is derived from the anode circuit.

Instead of designing the clamper circuits to establish fixed negative values from which the signals swing only in the positive direction, it would be possible to establish fixed negative biases along the straight line portions of the non-linear characteristics of Figs. 2 and 3 and cause the signals to swing in the negative direction. In such case the clamper diodes would be reversed and the C− grid bias decreased, or even reduced to zero. The signals would still operate over substantially the same portions of the non-linear characteristics in the two channels.

Another alternative is to reverse diode 39, leaving diode 34 as shown. This would clamp the signal in the lower channel at the black level, rather than at the white level. By providing a separate C− bias for diode 39 of reduced or even zero value, the black level may be fixed at a suitable point on the straight line portion of the characteristic and the signal will swing in a negative direction therefrom.

Summarizing the operation of the circuit of Fig. 1, an input video signal represented by waveform 3 is applied to the phase-splitting circuit comprising tube 5 and its associated circuit components, and two outputs inverted with respect to each other are supplied through leads 9 and 11. The inverted wave 18 appearing in lead 11 is supplied to the non-linear amplifying tube 21 in the upper channel and the highlights expanded with respect to the shadows, the expanded wave 53 being taken off the cathode circuit of the tube in inverted polarity. The voltage wave 8, appearing in lead 9 in the original polarity, is supplied to the non-linear amplifying tube 26 and the shadows are expanded with respect to the highlights. The voltage wave 59 appearing in the anode circuit is of inverted polarity, like that in the upper channel. The two waves 53 and 59 are hence of the same polarity but expanded in opposite directions. Thus the gamma of the two waves have been changed in opposite directions from the initial wave 3. The output signals of the two non-linear amplifying channels are supplied to the mixer circuit including tube 70 and combined into a single composite output wave as represented by waveform 97. By changing the relative proportions in inverse complementary relationship by means of control 66, the gamma of the output signal may be changed in either direction without substantially changing its amplitude.

It is advantageous for the video signal to pass through the two channels without substantial phase difference or difference in frequency response. This may be accomplished by means well known in the art.

Fig. 4 shows an embodiment similar to that of Fig. 1 but somewhat refined to improve the overall operation of the circuit and to facilitate adjustment. In this circuit pentodes have been employed instead of the triodes shown in Fig. 1, but it will be obvious to those in the art that various suitable tubes may be utilized as desired.

The input video signal such as shown by waveform 111, is applied to terminal 112 and fed through coupling capacitor 113 and grid resistor 114 to the phase-splitting pentode 115. Tube 115 has a divided cathode resistance composed of resistors 116 and 117. The grid is connected to the common point between these resistors through resistor 118, thus being returned to a point somewhat above ground potential. Screen grid 119 is supplied with suitable operating potential from a source marked Sc+ through a decoupling circuit comprising resistor 121 and bypass capacitor 122. The suppressor grid 123 is conventionally grounded. The anode is supplied with operating voltage from a suitable B+ source through resistor 124, shunted by low-frequency compensating capacitors 125 and 126, high-frequency compensating or peaking coil 127 and load resistor 128. Capacitor 125 is advantageously a large electrolytic capacitor and is shunted by a small mica capacitor 126 to insure effective compensation.

The anode output voltage, of inverted polarity as shown by waveform 131, is supplied through capacitor 132 and a small parasitic oscillation reducing resistor 133 to the control grid of the non-linear amplifying pentode 134 in the upper channel. The non-linear amplifier 134 functions as a cathode follower and is provided with a potentiometer 135 as cathode resistance. The variable contact 136 permits selecting any desired portion of the output signal. Screen grid 137 is supplied from a suitable source indicated Sc+ through decoupling resistor 138 and bypass capacitors 139, one of which may be a small mica capacitor. The suppressor grid 141 is conventionally grounded. Anode power supply is obtained from a suitable source of B+ through resistor 142 bypassed to ground by capacitors 143, one of which may be a small mica capacitor.

A clamper circuit is employed to maintain the black level operating point at a suitable negative bias. The clamper circuit comprises diode 144 shunted by resistor 145 and connected to potentiometer 146. The potentiometer is maintained negative to ground from a suitable source denoted C− through a decoupling circuit comprising resistor 147 and capacitors 148. By varying the movable contact of potentiometer 146, the operating point on the characteristic of tube 134 may be properly selected.

The video signal is supplied to the lower non-linear amplifying channel from the cathode of the phase-splitting tube 115 through capacitor 151 to the grid of the pentode 152 operating as a non-linear amplifier. The video signal will have the same polarity as the original input signal, as shown by waveform 153, and the same highlight to shadow range as the signal supplied to the upper channel. Tube 152 has a cathode resistor 154 and is supplied with anode voltage from a suitable B+ supply through resistor 155, shunted by low-frequency compensating capacitors 156, load resistor 157 and high-frequency compensating coil 158. The suppressor grid is conventionally grounded and the screen grid supplied from the same Sc+ source as tube 134.

A clamper circuit is provided similar to that for the upper channel, including diode 160, and the negative grid voltage may be adjusted by the use of potentiometer 159.

In order to facilitate equalizing the phase and high-frequency responses of the two channels, in Fig. 4 the circuit connections between the non-linear amplifier stage employing tube 152 and the mixer stage include a cathode-follower stage.

This cathode-follower stage includes pentode 161 whose grid is supplied from the anode output of tube 152 through coupling capacitor 162. A suitable grid bias is obtained from a C+ source through a voltage divider 163 and input resistor 164. Potentiometer 165 serves as cathode resistance and any desired portion of the output voltage may be selected by means of the variable contact 166. The grid bias is shown as C+ in the specific embodiment illustrated in order to obtain linear operation with the cathode resistor employed. The screen grid of tube 161 is supplied from a suitable voltage source Sc+, the suppressor grid is conventionally grounded, and the anode voltage obtained from a suitable B+ source through resistor 167 bypassed to ground by capacitors 168.

The mixer circuit is here shown as comprising two pentodes 171 and 172 having similar circuit components. For simplicity, only the connections for the upper tube 171 will be described in detail, it being understood that the same description applies to the lower tube 172.

The output signal of the upper channel is applied from potentiometer 136 through a small parasitic oscillation reducing resistor 173 to the control grid of tube 171. Suitable grid bias potential is obtained from a C− source through the voltage divider 174 and input resistor 175. The cathode and suppressor grids are conventionally grounded and the screen grid is supplied from a suitable Sc+ source through dropping resistor 176, bypassed to ground by capacitors 177, and an additional decoupling circuit composed of resistor 178 and bypass capacitor 179.

The non-linearly amplified output of the lower channel is supplied from potentiometer 166 to the control grid of tube 172 in the same manner as in the upper channel.

The anodes of tubes 171 and 172 are connected together and have a common anode circuit supplied with B+ voltage through resistor 181, shunted by low-frequency compensating capacitors 182, load resistor 183 and high-frequency compensating coil 184. The resultant composite signal is supplied through coupling capacitor 185 to the output terminal 186. The waveform is indicated by the dotted waveform 187.

The operation of the circuit is similar to that of Fig. 1 and need not again be described in detail. The operating potentials for tubes 134 and 152 are selected so that the tubes operate on similar non-linear characteristics as shown in Figs. 2 and 3, and the clamping circuits insure that the signal will always swing in a given direction from a fixed bias point in each channel so that, regardless of signal amplitude level (black to white) the signal will operate over substantially identical portions of the characteristic curves in the two channels. By using separate potentiometers 146 and 159 in the clamper circuits, fine adjustments may be made to insure that substantially identical portions of the tube characteristics are employed in the two circuits. The anode circuits of tubes 115 and 152 are designed so that the phase and frequency response of the two channels are equalized.

Potentiometers 136 and 166 are ganged together to a common control 188 so that as the output signal of one channel is increased, that of the other channel is decreased in like amount so as to maintain the amplitude of the composite signal at terminal 186 substantially constant. By varying the control 188 the two non-linearly amplified signals may be mixed in any desired proportion so as to change the gamma of the composite signal.

The over-all amplification of the gamma control amplifier may be approximately unity, although it may be designed for greater amplification if desired. The phase-splitter tube in the input circuit will commonly have a gain slightly less than unity. The non-linear channels themselves advantageously have substantially the same gains, so that the ganged control can change from the output of only one channel to the output of only the other channel to obtain full range of gamma control without substantial change in the magnitude of the composite signal. Since tubes 134 and 161 have cathode follower outputs, their gains are slightly less than unity. Tube 152 may have a gain of approximately unity to equalize the gains of the two channels. If desired for any reason, the two channels may have different gains and the outputs combined in any desired proportions. It will be understood that the terms "amplifier," "amplification," etc. are intended to cover gains less than unity as well as greater than unity.

Various ranges of gamma control may readily be obtained by proper selection of the type of tubes used for the non-linear amplification, and with proper selection of the tube characteristics used in operation through adjustment of the grid bias.

As described in connection with Fig. 1, the clamper circuits may be designed to establish fixed biases along the straight line portions of the non-linear characteristics, and the signals caused to swing in the negative direction therefrom. Or, both channels could be clamped at white or black levels.

Most normal scenes contain some white, and no difficulty has been encountered in clamping one channel at the white level. However, inasmuch as there is always a pedestal at the black level in the present standard video signal, this is a fixed level which can conveniently be used for clamping in both channels if desired. In case synchronizing signals have been inserted ahead of the gamma control amplifier, clamping could be performed at the sync signal level, since there is a fixed relationship between sync signal level and black or pedestal level. Suitable bias adjustments may be made to cause the picture portion of the signal to be applied to the desired non-linear portions of the characteristics. These and other possibilities will occur to those in the art.

The gamma control apparatus described hereinbefore may be used for either black-and-white or color television. For convenience of description, the terms "black" and "white" have been employed in many places to describe the video signal. It will be understood that in the case of color television the black will refer to the darkest portion of the component color signal and white will refer to the brightest portion of the component color signal. The term "highlights" will apply to the brightest portions of each component color image and the term "shadows" will apply to the darkest portions thereof. If desired, a separate gamma control amplifier may be employed for each component color. However, it is found in practice that with sequential color signals a single gamma control amplifier for the composite color signal gives good results.

In the descriptions of Figs. 1 and 4 it will be apparent that the whites or highlights are expanded in one channel and the blacks or shadows are expanded in the other channel, and the outputs of the two channels mixed in any desired portion. In some cases it may be felt desirable to expand the middle or gray portions of the signals. This type of operation may be obtained by utilizing non-linear amplifying tubes having characteristics such as shown in Fig. 5 at 191. If the lower knee 192 has a different curvature than the upper knee 193, the highlights and shadows will be compressed in both channels with respect to the middle or gray portions of the signal, but by different amounts. Therefore, when the outputs of the channels are mixed in different proportions the amount of compression of highlights and shadows with respect to the gray portions may be altered within a limited range.

It is also possible to operate on the lower knee 192 of the tube characteristic in one channel, and on the upper knee 193 in the other channel, and obtain an over-all result similar to that described in connection with Figs. 1 and 4. In such case the polarity of the signals applied to the two channels would be the same, rather than inverted. To take care of varying signal amplitudes, it would be advantageous to employ clamper circuits which would maintain an operating point at the lower portion of the lower knee, and at the upper portion of the upper knee in respective channels. The design of such clamper circuits will be well known to those in the art. When so operated, it is advantageous to have the curvature of the lower knee equal to that of the upper knee, except of course that the curvatures are in opposite directions, so that the curves are congruent.

In the above discussion a number of variations have been described. These and additional variations may be devised by those skilled in the art within the scope of the invention as defined in the appended claims.

I claim:

1. In a circuit for television signals and the like, apparatus for altering the gamma of picture signals which comprises a plurality of non-linear amplifier channels, a picture signal source for applying to said plurality of channels a picture signal having an amplitude range extending over substantial non-linear portions of the characteristics of said channels, respectively, and within the amplifying range thereof, the non-linear characteristics of said channels being predetermined with respect to the polarities of the picture signal applied thereto to expand different portions of the signal amplitude range in different channels, and circuit connections for combining the outputs of said channels in unlike amounts whereby the gamma of the picture signal may be altered.

2. In a circuit for television signals and the like, apparatus for altering the gamma of picture signals which comprises a plurality of non-linear amplifier channels each adapted to non-linearly amplify a picture signal applied thereto to thereby change the gamma thereof, a picture signal source for applying to said plurality of channels a picture signal having an amplitude range extending over substantial non-linear portions of the characteristics of said channels, respectively, and within the amplifying range thereof, the polarities of the picture signal applied to respective channels being predetermined with respect to the non-linear amplifying characteristics thereof to alter the gamma of the picture signal in different directions in different channels, and circuit connections for combining the outputs of said channels in unlike amounts, whereby the gamma of the picture signal may be altered.

3. In a circuit for television signals and the like, apparatus for altering the gamma of picture signals which comprises a plurality of non-linear amplifier channels, a picture signal source for applying to said plurality of channels a picture signal having an amplitude range extending over substantial non-linear portions of the characteristics of said channels, respectively, and within the amplifying range thereof, the polarities of the picture signal applied to respective channels being predetermined with respect to the non-linear amplifying characteristics thereof to amplify signal portions representing highlights to a greater extent than portions representing shadows in one channel and to a lesser extent in another channel, and an adjustable mixer circuit for combining the outputs of said channels in controllable proportions.

4. In a circuit for television signals and the like, apparatus for altering the gamma of picture signals which comprises a plurality of non-linear amplifier channels, an input circuit for applying a picture signal to said plurality of channels with substantially the same highlight-to-shadow range, the amplitude range of the applied picture signal extending over substantial non-linear portions of the characteristics of said channels, respectively, and within the amplifying range thereof, the polarity of the signal supplied to one channel being predetermined with respect to the non-linear characteristic of that channel to amplify one portion of the signal amplitude range more than another portion thereof, the polarity of the signal applied to another channel being selected with respect to the non-linear characteristic of said other channel to amplify said one portion of the signal amplitude range less than said other portion, and circuit connections for combining the outputs of said channels in unlike amounts, whereby the gamma of the picture signal may be altered.

5. In a circuit for television signals and the like, apparatus for altering the gamma of picture signals which comprises a pair of non-linear amplifier channels each adapted to non-linearly amplify a picture signal applied thereto, an input circuit for applying a picture signal simultaneously to said channels with substantially the same highlight-to-shadow range, the amplitude range of the applied picture signal extending over substantial non-linear portons of the characteristics of said channels, respectively, and within the amplifying range thereof, the polarities of the picture signal applied to respective channels being predetermined with respect to the non-linear amplifying characteristics thereof to amplify one portion of the signal amplitude range more than another portion in one channel and less than said other portion in the other channel, a mixer circuit supplied with the output signals of said channels in like polarity for combining said output signals into a single composite picture signal, and adjustable signal amplitude controls in the output circuits of said channels for altering the proportions of the respective output signals supplied to the mixer circuit.

6. In a circuit for television signals and the like, apparatus for altering the gamma of picture signals which comprises a pair of non-linear amplifier channels each adapted to non-linearly amplify a picture signal applied thereto to change the gamma thereof, an input circuit for applying a picture signal simultaneously to said channels with an amplitude range extending over substantial non-linear portions of the characteristics of said channels, respectively, and within the amplifying range thereof, the polarities of the picture signal applied to respective channels being predetermined with respect to the non-linear amplifying characteristic thereof to alter the gamma of the picture signal in opposite directions in different channels, a mixer circuit supplied with the output signals of said channels in like polarity for combining said output signals into a single composite picture signal, and adjustable signal amplitude controls in the output circuits of said channels correlated to change the respective output signals supplied to the mixer circuit in inverse relationship.

7. In a circuit for television signals and the like, apparatus for altering the gamma of picture signals which comprises a pair of non-linear amplifier channels each adapted to non-linearly amplify a picture signal applied thereto, an input circuit for applying a picture signal simultaneously to said channels with substantially the same highlight-to-shadow range, the amplitude range of the applied picture signal extending over substantial non-linear portions of the characteristics of said channels, respectively, the polarities of the picture signal applied to respective channels being predetermined with respect to the non-linear amplifying characteristics thereof to amplify one portion of the signal amplitude range more than another portion in one channel and less than said other portion in the other channel, clamping circuits connected to provide predetermined operating points on the non-linear characteristics of respective channels from which said signal swings in predetermined directions within the amplifying range thereof, a mixer circuit supplied with the output signals of said channels in like polarity for combining said output signals into a single composite picture signal, and adjustable signal amplitude controls in the output circuits of said channels for altering the proportions of the respective output signals supplied to the mixer circuit.

8. In a circuit for television signals and the like, apparatus for altering the gamma of picture signals which comprises a pair of amplifier channels having similar non-linear amplifying characteristics, an input circuit for applying a picture signal in inverse polarity to said non-linear amplifier channels with an amplitude range extending over substantial non-linear portions of the characteristics of said channels, respectively, and within the amplifying range thereof, to thereby amplify signal portions representing highlights to a greater extent than shadows in one channel and to a lesser extent than shadows in the other channel, a mixer circuit for combining a plurality of signals into a single composite output signal, and circuit connections for supplying the outputs of said channels to said mixer circuit including adjustable signal amplitude controls for altering the proportions between the two channel output signals to thereby control the gamma of the composite output signal.

9. In a circuit for television signals and the like, apparatus for altering the gamma of picture signals which comprises a pair of amplifier channels having similar non-linear amplifying characteristics, an input circuit for applying a picture signal in inverse polarity to said non-linear amplifier channels with an amplitude range extending over substantial non-linear portions of the characteristics of said channels, respectively, and within the amplifying range thereof, to thereby amplify signal portions representing highlights to a greater extent than shadows in one channel and to a lesser extent than shadows in the other channel, a mixer circuit supplied with the outputs of said channels for combining said outputs into a single composite picture signal, and adjustable signal amplitude controls in the output circuits of said channels correlated to change the signals supplied to the mixer circuit in substantially inverse complementary relationship to thereby alter the gamma of the composite picture signal without substantially changing the magnitude thereof.

10. In a television system, apparatus for controllably altering the gamma of video signals which comprises a pair of amplifier channels having similar non-linear amplitude characteristics, an input circuit for applying a video signal simultaneously to said non-linear amplifier channels with substantially the same highlight-to-shadow amplitude range extending over substantial non-linear portions of the characteristics of said channels, respectively, but in inverse polarity, clamping circuits connected to provide predetermined operating points on the non-linear characteristics of the two channels from which said signal swings within the amplifying range thereof, a mixer circuit supplied with the outputs of said channels in like polarity for combining said outputs into a single composite video signal, and adjustable signal amplitude controls in the output circuits of said channels correlated to change the signals supplied to the mixer circuit in substantially inverse complementary relationship to thereby alter the gamma of the composite video signal without substantially changing the magnitude thereof.

11. In a television system, apparatus for controllably altering the gamma of video signals which comprises a pair of electronic amplifier stages each having a similar non-linear amplitude characteristic between the input and output thereof, an input circuit for applying a video signal in inverse polarity but in substantially equal amplitude simultaneously to said stages, the amplitude range of the applied video signal extending over substantial non-linear portions of the characteristics of said stages, respectively, whereby signal portions representing highlights are amplified to a greater extent than shadows in one stage and to a lesser extent than shadows in the other stage, a clamping circuit associated with the input to each of said stages to apply said video signal to substantially like portions of the non-linear characteristics of the stages within the amplifying range thereof, an electronic mixer stage having a pair of input circuits and an output circuit, circuit connections for supplying the outputs of said non-linear amplifier stages to said mixer stage to form a single composite output video signal, and adjustable signal amplitude controls in circuit between respective non-linear stages and the mixer stage correlated to change the amplitudes of respective signals in substantially complementary relationship, whereby the gamma of the composite output video signal may be altered without substantially changing the magnitude thereof.

12. In a television system, apparatus for controllably altering the gamma of video signals which comprises an input phase-splitting circuit adapted to be supplied with a video signal, a pair of electronic amplifier stages each having a similar non-linear amplitude characteristic between the input and output thereof, connections between said phase-splitting circuit and said non-linear amplifier stages for supplying a video signal simultaneously to said stages with substantially the same highlight-to-shadow amplitude range extending over substantial non-linear portions of the characteristics of said stages, respectively, but in inverse polarity, a clamping circuit associated with the input to each of said stages biased to apply said video signal to substantially like portions of the non-linear characteristics of the stages within the amplifying range thereof, an electronic mixer stage having a pair of input circuits and an output circuit, circuit connections for supplying the outputs of said non-linear amplifier stages to said mixer stage to form a single composite output video signal, and adjustable signal amplitude controls in circuit between respective non-linear stages and the mixer stage correlated to change the amplitudes of respective signals in substantially inverse complementary relationship, whereby the gamma of the composite output video signal may be altered without substantially changing the magnitude thereof.

13. In a television system, apparatus for controllably altering the gamma of video signals which comprises an input circuit including an electronic tube phase-splitting stage adapted to be supplied with a video signal, said phase-splitting stage having anode and cathode output circuits to yield video signals of substantially equal amplitude but inverse polarity, a pair of electronic amplifier stages each having a similar non-linear amplitude characteristic between the input and output thereof, connections for supplying a video signal from said anode and cathode output circuits to respective non-linear amplifier stages with an amplitude range extending over substantial non-linear portions of the characteristics of said stages, whereby signal portions representing highlights are amplified to a greater extent than shadows in one stage and to a lesser extent than shadows in the other stage, a clamping circuit associated with the input to each of said non-linear stages biased to apply said video signal to substantially like portions of the non-linear characteristics thereof, an electronic mixer stage having a pair of input circuits and an output circuit, circuit connections for supplying the outputs of said non-linear stages to respective input circuits of the mixer stage in like polarity to form a single composite output video signal, and adjustable signal amplitude controls in circuit between respective non-linear stages and the mixer stage correlated to change the amplitudes of respective signals in substantially inverse complementary relationship, whereby the gamma of the composite output video signal may be altered without substantially changing the magnitude thereof.

14. In a television system, apparatus for controllably altering the gamma of video signals which comprises an input circuit including an electronic tube phase-splitting stage adapted to be supplied with a video signal, said phase-splitting stage having anode and cathode output circuits to yield video signals of substantially equal amplitude but inverse polarity, a first electronic amplifier stage having a cathode output circuit, a second electronic amplifier stage having an anode output circuit, each of said amplifier stages having a similar non-linear amplitude characteristic between the input and output thereof, connections for supplying a video signal from the anode and cathode output circuits of the phase-splitting stage to the first and second non-linear amplifier stages respectively with an amplitude range extending over substantial non-linear portions of the characteristics of said stages, whereby signal portions representing highlights are amplified to a greater extent than shadows in one stage and to a lesser extent than shadows in the other stage, a clamping circuit associated with the input to each of said non-linear stages biased to apply said video signal to substantially like portions of the non-linear characteristics thereof, a cathode-follower stage supplied from the anode output circuit of said second non-linear amplifier stage, an electronic mixer stage having a pair of input circuits and an output circuit, circuit connections for supplying the outputs of said first non-linear amplifier stage and said cathode-follower stage to respective input circuits of the mixer stage in like polarity to form a single composite output video signal, and adjustable signal amplitude controls in circuit between the mixer stage and the first non-linear amplifier and cathode-follower stages, respectively, said controls being ganged to change the amplitudes of respective signals in substantially inverse complementary relationship, whereby the gamma of the composite output video signal may be altered without substantially changing the magnitude thereof.

JAMES J. REEVES.

REFERENCES CITED

The following references are of record in the file of this patent:

UNITED STATES PATENTS

| Number | Name | Date |
|---|---|---|
| 2,179,414 | Konkle | Nov. 7, 1939 |
| 2,247,512 | Lewis | July 1, 1941 |
| 2,255,691 | Wilson | Sept. 9, 1941 |
| 2,368,453 | Deerhake | Jan. 30, 1945 |
| 2,406,760 | Goldmark | Sept. 3, 1946 |
| 2,406,882 | Young | Sept. 3, 1946 |